(12) United States Patent
Goldfeder et al.

(10) Patent No.: US 8,156,558 B2
(45) Date of Patent: Apr. 10, 2012

(54) MECHANISM FOR EVALUATING SECURITY RISKS

(75) Inventors: Aaron R. Goldfeder, Seattle, WA (US);
John M. Hawkins, Duvall, WA (US);
Sergey A. Khorun, Redmond, WA (US);
Viresh N. Ramdatmisier, Seattle, WA (US); Joseph Thomas Farro, Bothell, WA (US); Gregory Darrell Fee, Seattle, WA (US); Jeremiah S. Epling, Redmond, WA (US); Andrew G. Bybee, Duvall, WA (US); Jingyang Xu, Redmond, WA (US); Tony Edward Schreiner, Redmond, WA (US); Jamie L. Cool, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1086 days.

(21) Appl. No.: 10/440,518

(22) Filed: May 17, 2003

(65) Prior Publication Data

US 2004/0230835 A1  Nov. 18, 2004

(51) Int. Cl.
*G06F 11/30* (2006.01)
*G06F 12/14* (2006.01)
(52) U.S. Cl. ............. 726/25; 713/189; 713/188; 726/24
(58) Field of Classification Search ............... 726/22–26; 713/176, 187–189
See application file for complete search history.

(56) References Cited

U.S. PATENT DOCUMENTS

| | | | | |
|---|---|---|---|---|
| 5,421,006 A * | 5/1995 | Jablon et al. | ................ | 714/36 |
| 5,649,185 A | 7/1997 | Antognini et al. | ............ | 395/609 |
| 5,832,208 A | 11/1998 | Chen et al. | ............... | 395/187.01 |
| 5,974,549 A * | 10/1999 | Golan | ............................. | 726/23 |
| 6,167,521 A * | 12/2000 | Smith et al. | ..................... | 726/21 |
| 6,279,113 B1 * | 8/2001 | Vaidya | ............................ | 726/23 |
| 6,282,546 B1 | 8/2001 | Gleichauf et al. | ............ | 707/102 |
| 6,321,338 B1 * | 11/2001 | Porras et al. | .................... | 726/25 |
| 6,446,069 B1 | 9/2002 | Yaung et al. | ...................... | 707/9 |
| 6,704,874 B1 * | 3/2004 | Porras et al. | ................... | 726/22 |
| 6,782,478 B1 * | 8/2004 | Probert | ........................ | 713/191 |

(Continued)

FOREIGN PATENT DOCUMENTS

CN     1398481 A     2/2003

(Continued)

OTHER PUBLICATIONS

Schneier, Bruce, "Protocols, Algorithms, and Source Code in C", Applied Cryptography, Second Edition, pp. 34-38, 1996.

(Continued)

*Primary Examiner* — Zachary A Davis
(74) *Attorney, Agent, or Firm* — Merchant & Gould (57) ABSTRACT

Described is a mechanism for collectively evaluating security risks associated with loading an application. A hosting environment associated with loading the application invokes a trust manager to evaluate the security risks. The trust manager invokes a plurality of trust evaluators, where each trust evaluator is responsible for analyzing and assessing a different security risk. Upon completion of each security risk evaluation, results of those individual security risk evaluations are returned to the trust manager. The trust manager aggregates the variety of security risk evaluation results and makes a security determination based on the aggregated evaluation results. That determination may be to move forward with loading the application, to block the load of the application, or perhaps to prompt the user for a decision about whether to move forward with the load.

19 Claims, 5 Drawing Sheets

U.S. PATENT DOCUMENTS

| | | | |
|---|---|---|---|
| 6,785,820 B1 * | 8/2004 | Muttik et al. | 726/24 |
| 6,883,101 B1 * | 4/2005 | Fox et al. | 726/25 |
| 6,971,026 B1 * | 11/2005 | Fujiyama et al. | 726/25 |
| 7,032,114 B1 * | 4/2006 | Moran | 713/187 |
| 7,131,143 B1 * | 10/2006 | LaMacchia et al. | 726/30 |
| 7,178,166 B1 * | 2/2007 | Taylor et al. | 726/25 |
| 7,299,035 B2 * | 11/2007 | Morota et al. | 455/418 |
| 7,328,454 B2 * | 2/2008 | Strickland et al. | 726/25 |
| 7,350,204 B2 * | 3/2008 | Lambert et al. | 717/172 |
| 7,359,865 B1 * | 4/2008 | Connor et al. | 705/10 |
| 7,743,407 B2 * | 6/2010 | Sprigg et al. | 726/4 |
| 2002/0116627 A1 | 8/2002 | Tarbotton et al. | 726/22 |
| 2003/0236867 A1 | 12/2003 | Natsuno et al. | 709/220 |
| 2004/0006704 A1 * | 1/2004 | Dahlstrom et al. | 713/200 |
| 2004/0010709 A1 * | 1/2004 | Baudoin et al. | 713/201 |
| 2004/0073810 A1 * | 4/2004 | Dettinger et al. | 713/201 |
| 2004/0143750 A1 * | 7/2004 | Kulack et al. | 713/200 |
| 2004/0168086 A1 * | 8/2004 | Young et al. | 713/201 |
| 2004/0260940 A1 * | 12/2004 | Berg et al. | 713/200 |
| 2005/0204404 A1 * | 9/2005 | Hrabik et al. | 726/22 |
| 2005/0229256 A2 * | 10/2005 | Banzhof | 726/25 |
| 2006/0156407 A1 * | 7/2006 | Cummins | 726/25 |
| 2006/0218640 A1 * | 9/2006 | Lotem et al. | 726/25 |
| 2006/0265747 A1 * | 11/2006 | Judge | 726/22 |

FOREIGN PATENT DOCUMENTS

| | | |
|---|---|---|
| JP | 04-199436 | 7/1992 |
| JP | 06-250861 | 9/1994 |
| JP | 2000-056961 | 2/2000 |
| JP | 2001-515625 | 9/2001 |
| JP | 2002-278797 | 9/2002 |
| JP | 2003-050723 | 2/2003 |
| JP | 2003-108521 | 11/2003 |
| JP | 2005-517220 | 6/2005 |
| KR | 2003-29618 | 4/2003 |
| WO | WO 98/41919 | 9/1998 |
| WO | WO 01/60024 | 8/2001 |
| WO | WO 02/06295 | 1/2002 |
| WO | WO 02/097620 | 12/2002 |
| WO | WO 03/017068 | 2/2003 |
| WO | WO 2004107647 A1 * | 12/2004 |

OTHER PUBLICATIONS

Connolly, Julie L., "Operation Chain Link, The Deployment of a Firewall at Hanscom Air Force Base", IEEE, pp. 170-177, 1996.

Business Editors & Technology Writers, "ISS Ships New Version of Market-Leading Security Vulnerability Detection Solution", Business Wire, pp. 1-3, Oct. 19, 1998.

Shostack, Adam et al., "Towards a Taxonomy of Network Security Assessment Techniques", Razor, BindView Development, 15 pages, Jul. 2, 1999.

Business Editors/High-Tech Writers, "ForeScout Joins Systematic Technology Partner Program; ActiveScout Certified Interoperable with Symantec Enterprise Security Architecture", Business Wire, pp. 1-4, Jul. 30, 2003.

Office Action mailed Jul. 24, 2009, in JP Patent Application No. 2005-500406 (w/Translation).

Office Action mailed Dec. 1, 2009, in JP Patent Application No. 2005-500406 (w/Translation).

Office Action mailed Jun. 1, 2010, in JP Patent Application No. 2005-500406 (w/Translation).

Office Action mailed Mar. 13, 2009, in CN Application No. 03801954.X (w/Translation).

Office Action mailed May 27, 2010, in CN Application No. 03801954.X (w/Translation).

Office Action mailed Nov. 19, 2009, in KR Application No. 10-2004-7010654 (w/Translation).

Watanabe, Y.; "*Special Story on SWQC*"; NEC Technical Journal, vol. 44, No. 12, pp. 16-22, NEC Culture Center, Limited, Japan, Dec. 27, 1991 (see concise statement in Transmittal Letter).

Office Action mailed Mar. 2, 2011, in CN Application No. 03801954.X (w/Translation).

Office Action mailed May 25, 2011, in CA Application No. 2,472,366.

Office Action mailed Jul. 4, 2011, in CN Application No. 03801954.X (w/Translation).

Search Report mailed Oct. 25, 2011, in EP Application No. 03729010.3.

* cited by examiner

MECHANISM FOR EVALUATING SECURITY RISKS

FIELD OF THE INVENTION

The present invention relates to computer security systems. More particularly, the present invention relates to a mechanism for evaluating and aggregating security assessment information for computing systems.

BACKGROUND OF THE INVENTION

Computer users today have access to a multitude of different applications and utilities. The typical computer user may install dozens of computer programs on a computer over the course of a year. Most times, computer users knowingly install programs on their computers. For instance, a user may purchase a software program and install it manually. Sometimes a user may install a program unknowingly, such as by visiting a particular Web site that is configured to install an applet or small program on the users computer. Installing programs on computers has become so commonplace today that some users are unaware of the security issues involved with installing new software. Other users are keenly aware of the security issues in general, but are typically uncertain about the particular issues that may surround installing a particular program.

Most users understand that new programs can introduce viruses or other malicious code on their computers. Users also understand that some software developers make programs freely available that have an overt function or purpose, such as enhancing e-mail messages, and a covert function or purpose, such as recording information about the user that is later returned a marketing entity. This particular type of software is often referred to as "spyware." As a result, users often try to protect themselves from these security threats in various way. For instance, many users install anti-virus utilities to protect themselves against viruses. Fewer users also install anti-spyware utilities to address the spyware security issues.

Unfortunately, each security utility operates separately from each other and without knowledge of each other's results, thus burdening the user with assimilating the information from each security utility. Security systems today operate in a vacuum with respect to each other, and each reports to the user only on its specific security risk. Most users do not want separate notifications of different security risks from several disparate systems. Rather, they want their security systems just to work. The patchwork nature of security utilities today typically leaves users in fear that they have left a hole in their defenses, and that malicious or undesirable programs will slip through. Because of that fear, many users are reluctant to try new programs, especially in online environments.

Unfortunately, there are currently no mechanisms that can protect a user from multiple disparate security risks presented by a particular software program when it is being downloaded, installed, or executed. An adequate mechanism for evaluating security risks has eluded those skilled in the art.

SUMMARY OF THE INVENTION

The present invention is directed at a system and method for accumulating security assessment information about a program and operating on that information in a convenient and usable fashion. Briefly stated, a hosting environment is responsible for loading an application. In response to the initiation of the application load, the hosting environment invokes a trust manager to evaluate any security risks associated with that application. The trust manager invokes a plurality of trust evaluators, where each trust evaluator is responsible for analyzing and assessing a different security risk. Upon completion of each security risk evaluation, results of those individual security risk evaluations are returned to the trust manager. The trust manager aggregates the variety of security risk evaluation results and makes a security determination based on the aggregated evaluation results. That determination may be to move forward with loading the application, to block the load of the application, or perhaps to prompt the user for a decision about whether to move forward with the load. Advantageously, if prompted, the user can make a decision based on the collective security assessment of the application, which provides the user with a greater sense of protection about his computer system in general.

DETAILED DESCRIPTION OF THE PREFERRED EMBODIMENT

Figure 1:
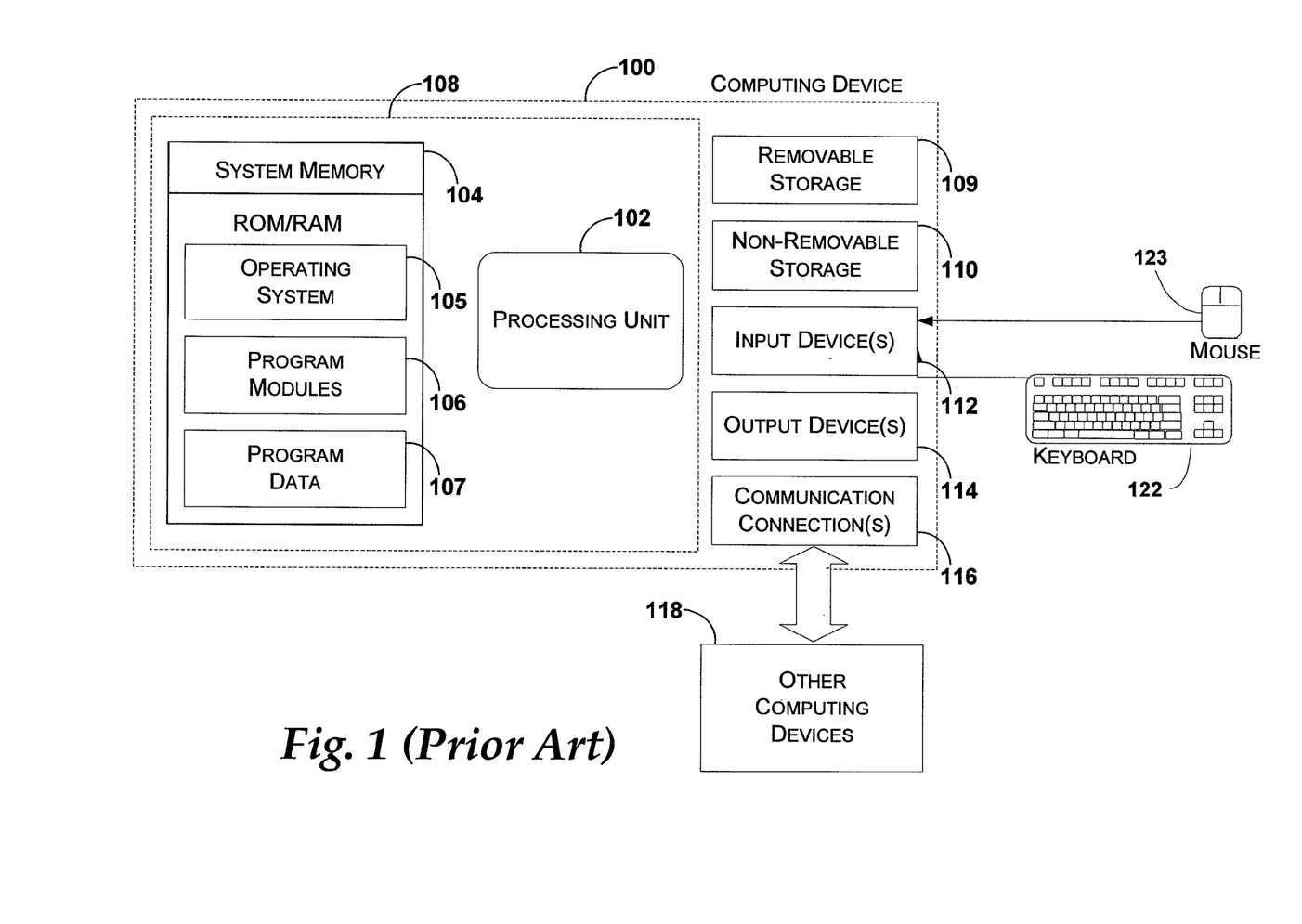
FIG. 1 is a functional block diagram that illustrates a computing device that may be used in implementations of the present invention.

The invention will be described here first with reference to one example of an illustrative computing environment in which embodiments of the invention can be implemented. Next, a detailed example of one specific implementation of the invention will be described. Alternative implementations may also be included with respect to certain details of the specific implementation. It will be appreciated that embodiments of the invention are not limited to those described here.
Illustrative Computing Environment of the Invention FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Discussion of Specific Implementation

Figure 2:
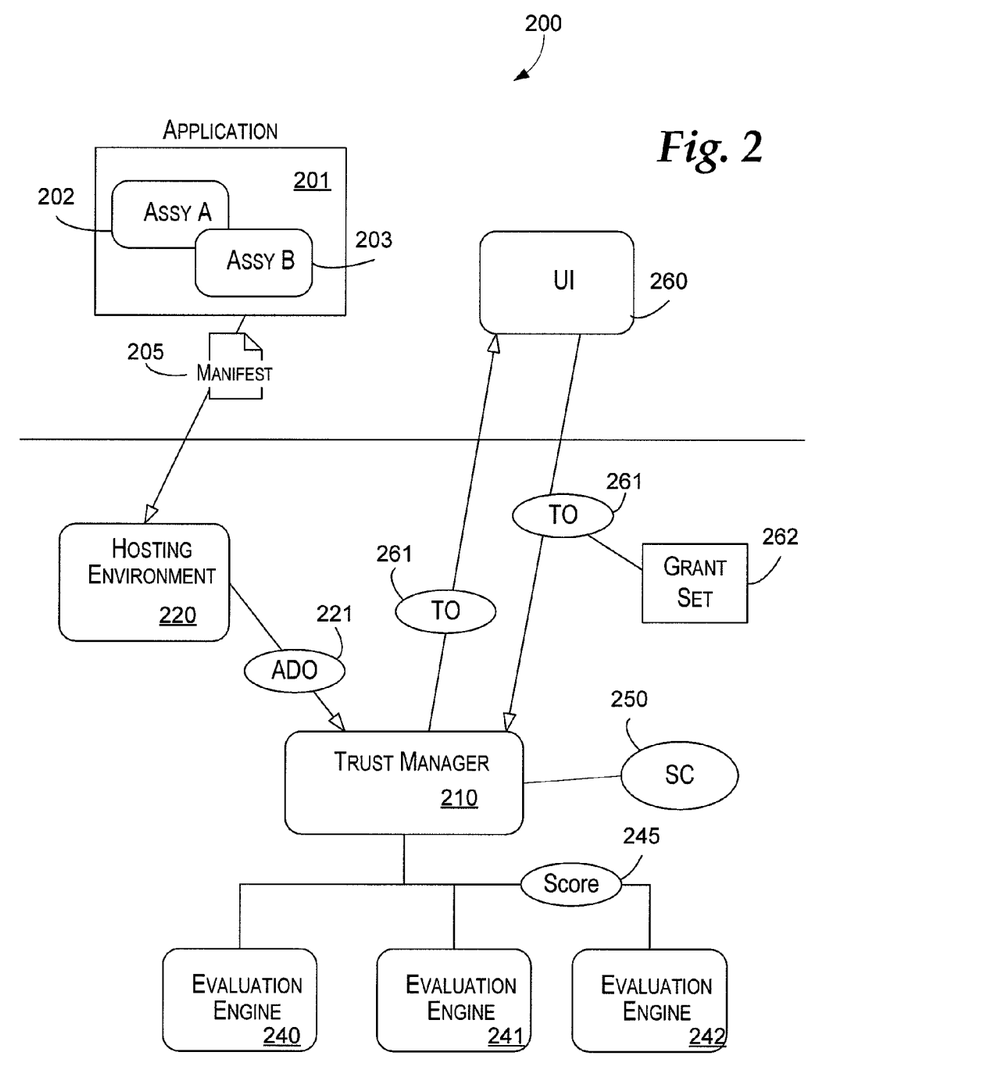
FIG. 2 is a functional block diagram generally illustrating components of a system for performing a security evaluation of an application and for presenting a user with a collective security assessment of that evaluation.

FIG. 2 is a functional block diagram generally illustrating components of an environment implementing the present invention. As shown in FIG. 2, a trust evaluation system 200 is configured to evaluate an application 201 and identify any security risks associated with the application 201. The application 201 may be any executable code that is available to the computing device 100. There are inherently some security risks associated with executing the application 201 on the computing device 100. For instance, the application 201 may contain a virus or it may constitute spyware. Accordingly, the system 200 is configured to analyze the application 201 to assess and quantify those risks in a meaningful way. The trust evaluation system 200 then makes a decision about loading the application 201.

The application 201 may be composed of several components operating in conjunction. For instance, the application 201 may include multiple modules or assemblies, such as assembly A 202 and assembly B 203. The application 201 may include metadata that describes the application and each of its constituent components. That metadata may be contained in a manifest 205 or otherwise stored in association with the application 201. The metadata may include information such as the name of the application, the version of the application, what rights and permissions the constituent components of the application desire, privacy policy information, digital signature information, and the like.

The application 201 may be first loaded onto the computing device 100 in one of many ways. For instance, the application 201 may be downloaded during an Internet session, it may be obtained on an optical disk or other permanent storage, it may be received in an e-mail message, or through some other mechanism. In this implementation, the application 201 is loaded by and executed in a hosting environment 220. For the purpose of this discussion, the hosting environment 220 includes any environment in which the application 201 will be executed. For instance, the hosting environment 220 may be a managed code runtime environment, a shell, another application, or the like. In this particular embodiment, the hosting environment 220 may include a priority rating based on the type of host it is. For instance, it may be determined that a hosting environment associated with an optical disk drive may pose a lower security risk than a hosting environment associated with a network session, such as the Internet. The priority rating may be used later when assigning a security score to the application 201.

The hosting environment 220 is configured to create an Application Description Object (ADO) 221 based on the metadata about the application 201. The hosting environment 220 includes in the ADO 221 sufficient information about the application 201 to effectively evaluate the security risks associated with the application 201. Accordingly, the ADO 221 may include, in object form, the name of the application, the version of the application, what rights and permissions the constituent components of the application desire, privacy policy information, digital signature information, and the like. The hosting environment 220 is further configured to invoke a Trust Manager 210 to perform the evaluation.

The Trust Manager 210 may be a trusted component of an operating system resident on the computing device 100. In this particular embodiment, the Trust Manager 210 exposes an interface that is called by the hosting environment 220 to initiate the security evaluation of the application 201. The Trust Manager 210 receives the ADO 221 from the hosting environment 220 via the interface. The Trust Manager 201 is further configured to invoke a series of trust evaluation engines to assess the security risk associated with the application 201. Each evaluation engine is configured to evaluate a particular class of threat based on information in the ADO 221 or on the components of the application 201 itself For instance, evaluation engine 240 may be a scoring engine that evaluates evidence about the application, as may be contained in the ADO 221 or elsewhere, to determine the ability of the application to perform malicious acts on the computing device 100. Evaluation engine 241 may be a virus checker and evaluation engine 242 may be configured to evaluate privacy concerns about the application 201. Each of the evaluation engines may derive from a base class, or may be implemented as an interface.

Each evaluation engine is configured to assess the application 201 against its particular rules or criteria to determine a score 245. Examples of the score include a numerical value between a minimum and maximum, or a discrete value from a set of alternative security levels. These are only examples and not an exhaustive list. The score 245 may then be returned to the Trust Manager 210 by each evaluation engine at the conclusion of its assessment. The Trust Manager 210 is configured to aggregate the individual scores into a score collection 250, which represents the collective security assessment of the application in each of the areas for which an evaluation engine exists. Any priorities that may exist, such as priorities associated with the particular type of hosting environment 220, may be applied to the score collection 250 to further refine the collective security assessment. Based on the collective security assessment, the Trust Manager 210 may have sufficient information to make a loading decision without involving the user. For instance, pre-determined thresholds (either set by default or perhaps provided by the user) may govern what programs are loaded without seeking user acceptance, or what programs are blocked without prompting the user. If the collective security assessment for the particular application being loaded falls between those two thresholds, the user may be prompted for a loading decision.

Figure 3:
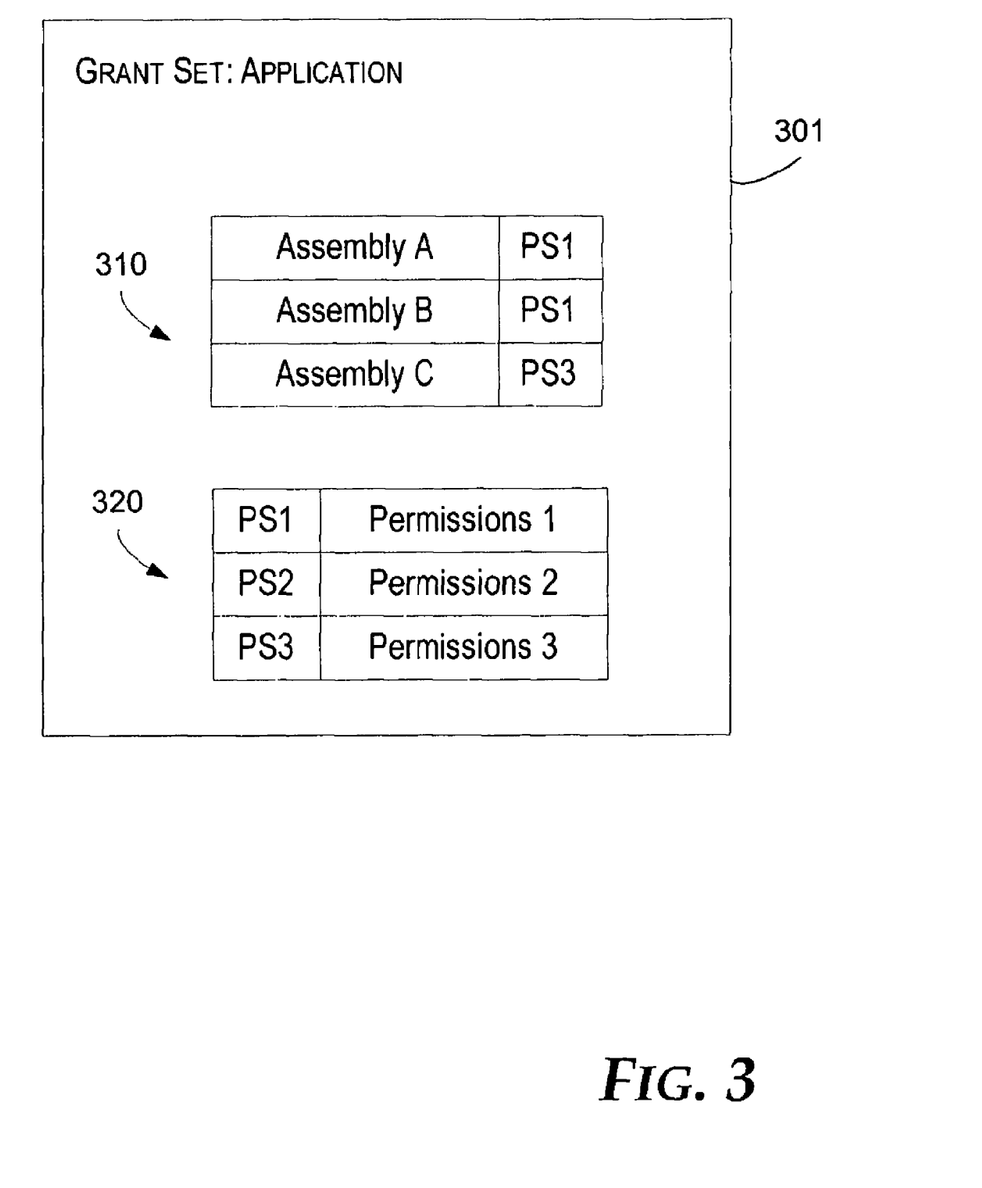
FIG. 3 is a graphical representation of one illustrative grant set for an application that associates particular permissions with components of the application in the context of the application.

The Trust Manager 210 constructs a Trust Object 261 that describes the level of permissions with which the application will be loaded, if at all. The Trust Object 261 may include data that defines a permission grant set 262 for the application on a component-by-component basis. One example of an illustrative permission grant set 262 is illustrated in FIG. 3 and described below. If the collective security assessment for the application 201 falls between the two thresholds mentioned above, the Trust Manager 210 may pass the Trust Object 261 to a User Interface 260 so that the user may be prompted.

Figure 4:
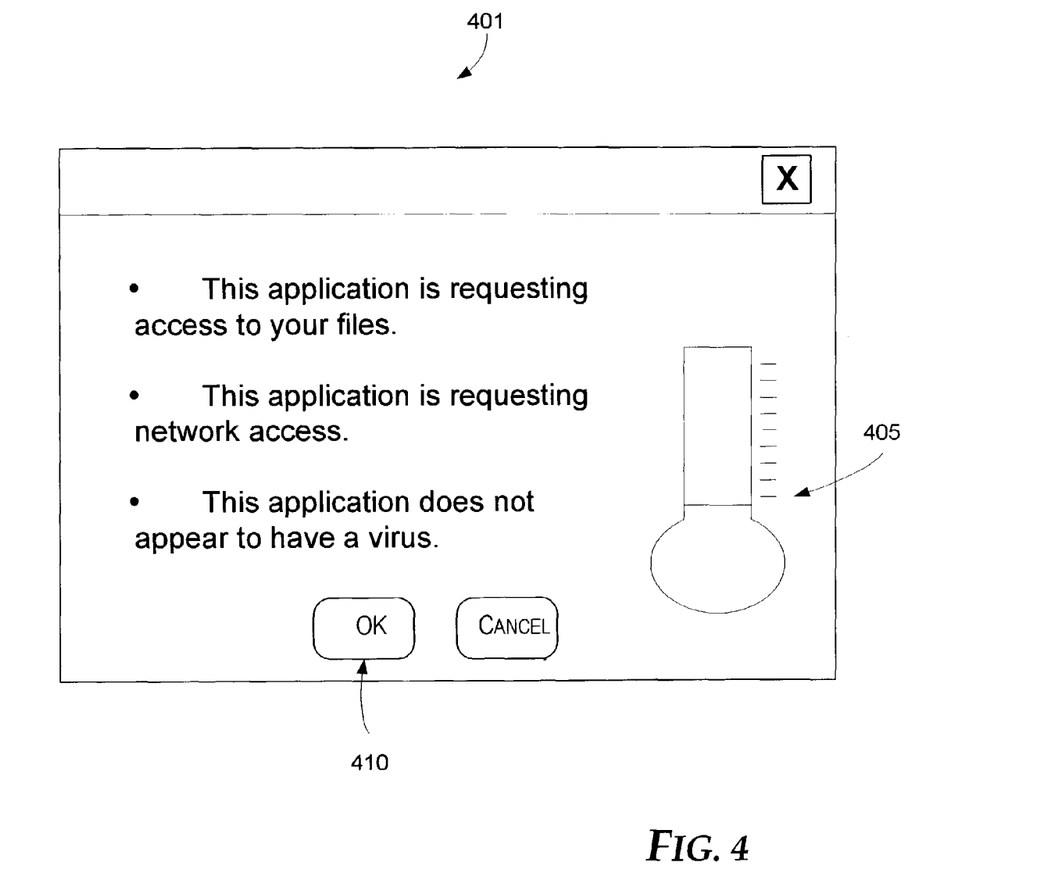
FIG. 4 is a graphical representation of one illustrative user interface that may be used to present collective security assessment information to a user.

The User Interface 260 is a mechanism for presenting the collective security assessment to the user in a meaningful way so that the user can make an informed decision about proceeding. The User Interface 260 may take many forms, such as a dialog box, an audible signal, an iconic indicator, or the like. One example of a potential User Interface 260 is illustrated in FIG. 4 and described below. In essence, the User Interface 260 represents a single point of presentation for various and disparate security information that, in conventional systems, does not exist.

The User Interface 260 may prompt the user with the potential security ramifications of allowing the application load to proceed, and possibly presenting the user with various levels of permissions that may be assigned to the application. The user is asked to make a determination whether to proceed with loading the application or not. The User Interface 260 adds the user's response information to the Trust Object 261 and returns it to the Trust Manager 210.

Each time the application 201 is launched or executed, its hosting environment 220 could invoke the Trust Manager 210 to retrieve the security assessment of the application 201. In the case where the grant set 262 has already been created, the Trust Manager 210 may return that grant set 262 to the hosting environment 220. Alternatively, the hosting environment 220 could cache the security assessment information for subsequent use without involving the Trust Manager 210. The hosting environment 220 will then apply any access permissions identified in the grant set 262 to the application 201. More specifically, the hosting environment 220 may apply the access permissions to each individual component, such as assembly A 202, of the application 201. It is equally feasible that the hosting environment 220 or some other application may present a component to the Trust Manager 210 for a security assessment without the specific intent of then executing the component.

FIG. 3 is a graphical representation of one illustrative grant set 301 that may be generated by implementations of the present invention. It should be noted that the term "grant set," as used in this document, means any collection of information that is used to define the security environment in which an application may execute. The term "grant set" used in this document is not limited to a particular security environment, such as a Common Language Runtime environment, but rather is intended to cover information used to define the security environment within which an application executes regardless of the particular operating environment.

In this particular example, the grant set 301 may be data within an object, such as a Trust Object or the like. In this example, the grant set 301 includes information that identifies each component of the application. In addition, the grant set 301 includes information that defines the permissions for each component of the application. In this case, a components table 310 identifies the components Assembly A, Assembly B, and Assembly C and associates each of those components with a permission set. For instance, in the grant set 301, Assembly A is identified as having permission set PS1.

A permissions table 320 is also included in the grant set 301 to define specifically those permissions and security rights that are associated with each permission set. In this example, permission set PS1 includes those permissions and rights identified in the example as Permissions 1. It will be appreciated that, as described above, when the hosting environment 220 begins to load the components of the application, by referring to the grant set 301 the appropriate permissions may be applied to each component of the application in the context of the application. In other words, some other application may also include Assembly B, but in the context of that other application, Assembly B may have a different permission set. In that case, when the other application was executed, and Assembly B was loaded, it would have the permission set defined by a grant set associated with the other application.

FIG. 4 is an illustrative User Interface dialogue that may be presented to a user based on a security assessment of an application. In this particular example, the dialog 401 is presented based on an evaluation of an application that has requested access to the file system and the network. In addition, a virus evaluator has determined that the application does not contain a virus. In iconic indication of the risk level 405 may also be included. The user is presented with the option of allowing the load to proceed, such as by clicking an OK button 410, or to abort the load. The User Interface shown in FIG. 4 is for the purpose of illustration only, and is not to be viewed as limiting or the exclusive mechanism for presenting security information to the user. Indeed, it is envisioned that very many different forms of collective security assessment presentation will become apparent from the teachings of this document.

Figure 5:
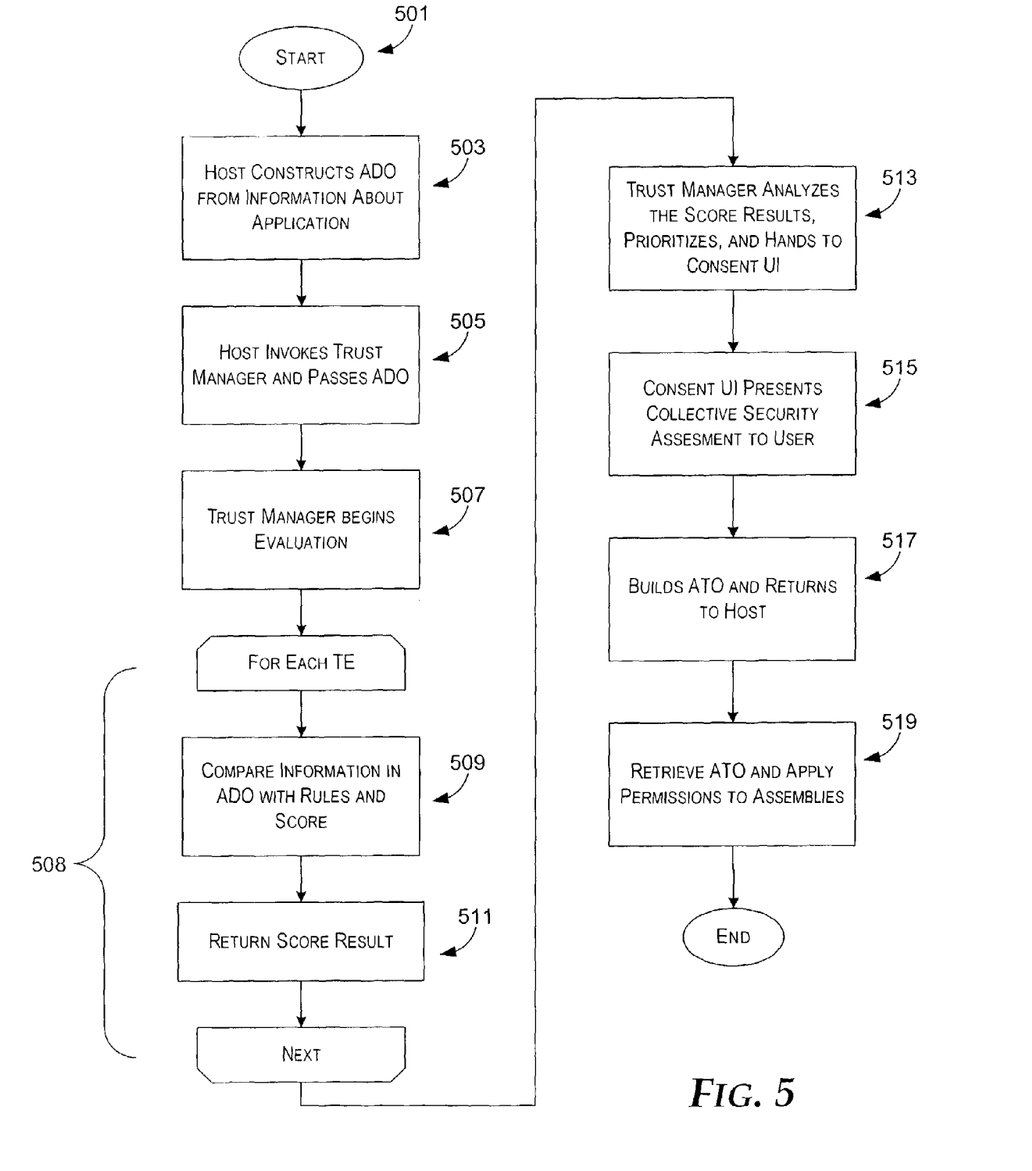
FIG. 5 is a logical flow diagram generally illustrating a process for evaluating the security risks associated with an application and for presenting to a user the collective security assessment.

FIG. 5 is a logical flow diagram generally illustrating a process for identifying and collectively presenting, in meaningful way, information about security risks posed by an application. The process begins at starting block 501, where an application is being loaded for execution on a computing system. As discussed above, an application may be loaded in many ways through various types of hosts. Accordingly, at starting block 501, a particular application is being loaded through use of a particular host. The process continues at block 503.

At block 503, the host constructs an Application Description Object (ADO) based on information about the application. As described above, the information may be obtained from a manifest included with the application, or through any other metadata associated with the application. The ADO contains descriptive information about the application, such as the name and version of the application, any rights being requested by the application, any code access permissions being requested by the application, digital signature information related to the application, privacy policy information, and the like. The process continues at block 505.

At block 505, the host invokes a Trust Manager with an instruction to evaluate the security risks associated with the application. The host passes the ADO to the Trust Manager for use in the evaluation.

At block 507, the Trust Manager begins evaluating the security risks of the application by invoking a series of Trust Evaluators that each evaluate a specific area of security risk. For instance a virus evaluator may be configured to examine each component of an application for the possibility that the application contains a virus. A privacy evaluator may evaluate the permissions requested by the application to determine what level of threat to privacy the application presents. Many other Trust Evaluators may also be used, as will be apparent to those skilled in the art.

Loop 508 is performed for each Trust Evaluator in the system. The Loop 508 begins at block 509, where the current Trust Evaluator examines the information in the ADO and/or the components of the application to assess the security risk. The information in the ADO may be compared against a set of rules or other criteria to build a score that quantifies the security risk of the application. In one example, a score may be a value from zero (maximum risk) to one (minimum risk). The score may also include a priority and a string descriptor.

It will be appreciated that the evaluations being performed by each Trust Evaluator are analogous to similar security risk evaluations that may be performed by conventional mechanisms. However, in accordance with the invention, each Trust Evaluator assesses its respective security risk and returns the score collection to the Trust Manager (block 511). When each Trust Evaluator has returned its score collection to the Trust Manager, the loop 508 terminates and the process continues to block 513.

At block 513, the Trust Manager analyzes the score collections from the Trust Evaluators. The Trust Manager may prioritize the score collections based on some pre-determined criteria, such as a priority associated with a particular Trust Evaluator, or some other prioritization scheme. For instance, a high risk that a virus is present may outweigh a low risk that a privacy violation may occur. The Trust Manager determines, from the prioritized score collections, an aggregate security impact on the computing system. If the aggregate security impact on the system exceeds some pre-determined threshold, the Trust Manager may simply block the load of the application. If the aggregate security impact is below some other threshold, the Trust Manager may simply build a Trust Object that includes sufficient permissions for the application to execute. If however, neither of these cases exists, the Trust Manager may invoke a User Interface to prompt the user to make the determination.

At block 515, the Trust Manager passes the prioritized score collection and aggregate impact information to the User Interface for final evaluation if required from the user. If so, the aggregate security impact is presented to the user. The presentation may be in the form of a dialog box that summarizes or details specifically the security risks associated with loading the application. For instance, a scoring engine may have determined that the application has requested sufficient permissions to read and modify files on the computer, and to transmit data over a network connection. Based on that information, together with perhaps other evidence, a privacy evaluator may have determined that the application is likely to share the user's information over the network. Accordingly, that information may be combined to inform the user that loading the application is likely to result in the user being targeting by telemarketing campaigns or other inappropriate uses of the user's personal information. Advantageously, the user is presented with disparate security information collected into a common notification, such as a dialog box or the like.

At block 517, with any input from the User Interface, the Trust Manager modifies the Trust Object to describe the security environment in which the application may be executed. In one embodiment, the Trust Object includes data that associates the application, or components of the application, with a permission grant set. The permission grant set describes the level of security that will be applied to the application when executed. In one specific environment, a permission grant set is associated with each component of the application. In that way, a component that is shared among different applications may be executed with different permissions depending on the application context in which it is executing. The process may idle at block 517 until the application is actually executed, thereby causing the host to begin loading components of the evocation. At that point, the process continues to block 519.

At block 519, the application is being loaded by the host. As part of a security policy that applies to applications being loaded, the host queries the Trust Manager for the Trust Object associated with the application. As each component of the application is loaded, the permission grant set associated with that component is applied. In this way, applications that have been loaded in accordance with the invention are only allowed those permissions which the user has, in an informed way, directly and comprehensively established. If sufficient privileges to execute have not been granted to the application, the Trust Manager may block the execution of the application.

The above specification, examples and data provide a complete description of the concepts and illustrative implementations of the invention. Since many embodiments of the invention can be made without departing from the spirit and scope of the invention, the invention resides in the claims hereinafter appended.

We claim:

1. A computer-readable storage medium having computer-executable components which, when executed by a processor, perform steps comprising:

receiving a notification that an application consisting of software components to be evaluated for security risks is being loaded for execution and, in response to receiving the notification and before the application is allowed to completely load for execution: evaluating the application for security risks using a trust manager, wherein the application consists of the components, wherein evaluating the application for the security risks includes:

a hosting environment initiating the evaluation of the application for security risks;

after receiving the notification, executing a first software evaluation engine to assess a first security risk that is associated with the application, wherein the first evaluation engine returns a first score that relates to the first security risk, wherein the first software engine examines each software component of the application for a presence of a virus;

after receiving the notification, executing a second software evaluation engine to assess a second security risk that is associated with the application, wherein the second evaluation engine returns a second score that relates to the second security risk;

aggregating the scores associated with each security risk evaluation to determine a collective security assessment based on the aggregated scores, wherein a grant set associated with the application identifies each of the different components of the application and defines different permissions for each of the components of the application, the grant set for the application including a first table that lists each of the components constituting the software application and that, for each of the listed components in the first table, specifies a permission set that defines permissions and security rights; and the grant set for the software application including a second table that includes the permissions that are associated with each of the permission sets included in the first table and, for each permission set in the second table, corresponding permissions and rights for each permission set that is associated with each component and is accessed by the associated component when it is loaded;

refining the collective security assessment by factoring in a security of a hosting environment, wherein the security of the hosting environment is based on a priority rating;

automatically blocking loading of the application when the collective security assessment is above a first predetermined threshold;

automatically loading the application when the collective security assessment is below a second predetermined threshold; and when the collective security assessment is between the first predetermined threshold and the second predetermined threshold, displaying a user interface configured to present the collective security assessment determined by the trust manager and present an option to receive a determination of whether to allow the load of the application to proceed, wherein the user interface provides a graphical description of a risk level for executing the application.

2. The computer-readable storage medium of claim 1, wherein the application is being loaded by the hosting environment, and wherein the hosting environment issues the notification to the trust manager.

3. The computer-readable storage medium of claim 2, wherein the hosting environment is configured to create an Application Description Object that includes descriptive information about the application.

4. The computer-readable storage medium of claim 3, wherein the descriptive information includes the name of the application and the version of the application.

5. The computer-readable storage medium of claim 3, wherein the descriptive information identifies rights and permissions requested by components of the application.

6. The computer-readable storage medium of claim 3, wherein the descriptive information includes privacy policy information.

7. The computer-readable storage medium of claim 3, wherein the descriptive information includes digital signature information about the application.

8. The computer-readable storage medium of claim 1, wherein the security risk evaluations are performed by separate trust evaluators, each trust evaluator being configured to analyze a particular security risk associated with the application.

9. The computer-readable storage medium of claim 8, wherein the particular security risk comprises a violation of privacy.

10. The computer-readable storage medium of claim 1, wherein the collective security assessment identifies one or more security risks associated with loading the application.

11. The computer-readable storage medium of claim 1, wherein the trust manager is further configured to aggregate scores from security risks.

12. A computer-readable storage medium having computer-executable components, comprising:

a trust manager configured to perform actions, including:
  receiving a notification from a hosting environment that a software application to be evaluated for a plurality of security risks is attempting to load and be executed, wherein the software application consists of different components;
  in response to receiving the notification, evaluating the software application for the plurality of security risks using different evaluation engines before the software application is loaded and executed, wherein evaluating the application for a plurality of risks comprises examining each component of the application to determine a possibility of a presence of a virus within the application;
  aggregating scores associated with each security risk evaluation to determine a collective security assessment based on the aggregated scores, wherein a grant set associated with the software application identifies the different components of the software application and defines different permissions for each of the components of the application, the grant set for the software application including a first table that lists each of the components constituting the software application and that, for each of the listed components in the first table, specifies a permission set that defines permissions and security rights, and the grant set for the software application including a second table that includes the permissions that are associated with each of the permission sets included in the first table and for each permission set in the second table, corresponding permissions and rights for each permission set that is associated with each component and is accessed by the associated component when it is loaded;
  automatically blocking loading of the application when the collective security assessment is above a first predetermined threshold;
  automatically loading each of the different components of the application when the collective security assessment is below a second predetermined threshold; and
  when the collective security assessment is between the first predetermined threshold and the second predetermined threshold, displaying a user interface configured to present the collective security assessment determined by the trust manager and present an option to receive a determination of whether to allow the load of the application to proceed, wherein the user interface provides a graphical description of a risk level for executing the application; and an application loading component for loading the application when determined using the permission sets specified in the grant set.

13. A computer-implemented method, comprising:

receiving a notification that an application, consisting of software components that are loaded to execute the application and are to be evaluated for a plurality of security risks is being loaded by a hosting environment;

receiving an application description object that includes information about the application, wherein the information includes a name of the application, a version of the application and rights requested by the application;

invoking a trust manager after receiving the notification;

receiving at the trust manager an instruction from the hosting environment to evaluate the application being loaded for security risks;

after receiving the notification that an application is being loaded, evaluating the application using multiple evaluation engines to determine the security risks associated with the application, wherein evaluating the application to determine the security risks associated with the application comprises examining each component of the application for a possibility of a security risk;

aggregating results from the evaluation of the security risks to determine a collective security assessment, wherein a grant set associated with the application identifies each of the different components of the application and defines different permissions for each of the components of the application, the grant set for the application including a first table that lists each of the components constituting the software application and that, for each of the listed components in the first table, specifies a permission set that defines permissions and security; and the grant set for the software application including a second table that includes the permissions that are associated with each of the permission sets included in the first table, and for each permission set in the second table, corresponding permissions and rights for each permission set that is associated with each component and is accessed by the associated component when it is loaded;

automatically blocking loading of the application when the collective security assessment is above a first predetermined threshold;

automatically loading the application when the collective security assessment is below a second predetermined threshold; and when the collective security assessment is between the first predetermined threshold and the second predetermined threshold:
 presenting the aggregated results as a graphical collective security assessment of the application; and
 presenting an option to determine whether to allow the loading of the application when the application is not automatically loaded based on the collective security assessment and when the application is not automatically blocked from loading based on the collective security assessment.

14. The computer-implemented method of claim 13, wherein causing the application to be evaluated further comprises invoking a plurality of trust evaluators, each trust evaluator being associated with a different possible security risk, each trust evaluator being operative to assess a likelihood that the application suffers from the particular possible security risk corresponding to that trust evaluator; wherein each trust evaluator is invoked through a software call.

15. The computer-implemented method of claim 13, further comprising assigning a permission set to components of the application, the permission set defining permissions with which each of the components of the application will be allowed to execute.

16. The computer-implemented method of claim 15, further comprising, in response to a notification to execute the application, retrieving the permission set and causing the application to be executed with the appropriate permissions.

17. The computer-implemented method of claim 15, wherein the permission set is modified based on the hosting environment in which the application is executed.

18. The computer-implemented method of claim 15, further comprising terminating the loading of the application in response to the aggregated results.

19. The computer-implemented method of claim 15, wherein evaluating the application to determine the plurality of security risks associated with the application comprises examining the application to determine the security risks after the notification that the application is being loaded by the hosting environment is received.

* * * * *

UNITED STATES PATENT AND TRADEMARK OFFICE
CERTIFICATE OF CORRECTION

| | | |
|---|---|---|
| PATENT NO. | : 8,156,558 B2 | Page 1 of 1 |
| APPLICATION NO. | : 10/440518 | |
| DATED | : April 10, 2012 | |
| INVENTOR(S) | : Aaron R. Goldfeder et al. | |

It is certified that error appears in the above-identified patent and that said Letters Patent is hereby corrected as shown below:

In column 10, line 27, in Claim 12, after "and" insert -- , --.

Signed and Sealed this
Ninth Day of October, 2012

David J. Kappos
*Director of the United States Patent and Trademark Office*